3,085,928
METHOD OF COMBATING NEMATODES

Arnold Hausweiler, Cologne-Flittard, Bernhard Homeyer, Opladen, Karlheinz Legrand, Leverkusen, and Klaus Schwarzer, Cologne-Flittard, Germany, assignors to Farbenfabriken Bayer Aktiengesellschaft, Leverkusen, Germany, a corporation of Germany
No Drawing. Filed Sept. 15, 1959, Ser. No. 840,021
Claims priority, application Germany Sept. 16, 1958
7 Claims. (Cl. 167—22)

The present invention relates to and has as its objects a method of combating nematodes and new and useful nematicidal compositions. The new compositions consist of mixtures of 1.4-dichloro-butene and other chlorinated lower hydrocarbons containing 3 or 4 carbon atoms.

The occurrence of phytophathogenic nematodes on our cultivated plants in horticulture and agriculture is, in general, the result of intense cultivation. If this individual, mainly specific host plants are consecutively cultivated in too short intervals the population of nematodes increases to such an extent that they may cause deficiencies or reduced yields. Very effective counter-measures are provided by suitable crop rotation, that is to say, to cultivate the host plants which may be infected on the same soil in intervals of several years only. Where this is impossible for economical reasons a direct combating of the nematodes in the soil cannot be avoided.

Combatting nematodes with, inter alia, ethylene dibromide, mixtures of 1.3-dichloropropene and 1.2-dichloropropane, or 1.4-dichlorobutene, is known. Pure 1.4-dichlorobutene has, however, the disadvantage that it stays very long in the soil thus involving a very long refraining period from cultivation.

In accordance with the present invention it has now been found that mixtures of 1.4-dichlorobutene and chlorinated lower hydrocarbons from 3 to 4 carbon atoms are very suitable for combating nematodes.

These chlorinated lower hydrocarbons containing 3 to 4 carbon atoms are e.g. 2.3-dichloropropene, 1.2-dichloropropane, 1.2-dichloropropene-(1), 1.1.2.3.3-pentachloropropane, 1.2-dichlorobutane, 2.3-dichlorobutane, 2.4-dichlorobutene-(2), 3.4-dichlorobutene-(1), 1.2.3-trichlorobutane or 2.2.3-trichlorobutane. The aforementioned compounds, however, should not limit the scope of the present invention in any way.

The compounds mentioned before do not have a nematicidal action per se or this action at least is very low. The mixtures with 1.4-dichlorobutene, however, are nematicidal compositions which exhibit a very remarkable activity, compared with the components of the composition.

In general, good results are obtained by using mixtures containing 10 to 60% by weight of 1.4-dichlorobutene and 40 to 90% by weight of the above said chlorinated hydrocarbons, although, in some cases other mixing ratios are also applicable. The mixtures according to this invention, compared with the pure 1.4-dichlorobutene have the advantage of a better plant tolerance. The effect of the latter is that in practice the necessary refraining periods from the application of the nematicide to the soil until the period of planting can, in some cases, be appreciably reduced. This advantage is of great importance especially in intense cultivation, chiefly in horticulture.

The following examples are given for illustrating the present invention:

Example 1

Soil taken from fields and infested with nematodes indicated below was treated in Mitscherlich pots of 5 litres capacity with staggered quantities of the compounds indicated below. The pots infested with *Meloidogyne incognita* were kept in a green house at 25° C., the other pots in the open air and uncovered. After a refraining period of 3 weeks tomatoes, carrots, sugar beets and barley were planted or sown. The evaluation of the roots as to infestation by nematodes was carried out six weeks later. The table shows the lowest quantities at which no nematode infestation is recognizable.

|  | *Meloidogyne incognita*, p.p.m. | *Heterodera rostochiensis*, p.p.m. | *Pratylendnus pratensis*, p.p.m. |
|---|---|---|---|
| Ethylene dibromide | 10 | 20 | 10 |
| 1.4-dichlorobutene | 15 | 20 | 10 |
| 2.3-dichloropropene | 80 | 110 | 90 |
| Mixture of 15— 1.4-dichlorobutene and 85% 2.3-dichloropropene | 50 | 50 | 50 |
| Mixture of 50% 1.3-dichloropropene and 50% 1.2-dichloropropane | 50 | 60 | 50 |

Example 2

For testing the plant tolerance or ascertaining the necessary refraining period from cultivation 12 square metre-allotments were treated in each case with respective quantities of 10, 20, 30, 40 and 50 cc. of the preparation at 9 injection points per square metre. The soil used was medium weight sandy clay soil. The soil temperature in 5 m. depth during the tests varied between 12 and 18° C. Lettuce and carrots were sown 1 and 3 weeks after treatment of the soil. The evaluation of plant growth was carried out in each case after 4 weeks of sowing. The following scheme served for the evaluation:

2 means normal plant growth
3 means slight damage to plant growth
4 means strong damage to plant growth
5 means very strong damage to plant growth.

|  | 10 ccm./ m.² | 20 ccm./ m.² | 30 ccm./ m.² | 40 ccm./ m.² | 50 ccm./ m.² |
|---|---|---|---|---|---|
| Lettuce after 1 week: | | | | | |
| ethylene dibromide | 4 | 4 | 5 | 5 | 5 |
| 1.4-dichlorobutene | 3 | 4 | 4 | 5 | 5 |
| 2.3-dichloropropene | 2 | 2 | 2 | 2 | 2 |
| mixture of 15% 1.4-dichlorobutene and 85% 2.3-dichloropropene | 2 | 2 | 2 | 2 | 2 |
| mixture of 50% 1.3-dichloropropene and 50% 1.2-dichloropropane | 2 | 2 | 3 | 3 | 4 |
| control | 2 | 2 | 2 | 2 | 2 |
| Lettuce after 3 weeks: | | | | | |
| ethylene dibromide | 3 | 4 | 4 | 4 | 5 |
| 1.4-dichlorobutene | 3 | 3 | 3 | 4 | 4 |
| 2.3-dichloropropene | 2 | 2 | 2 | 2 | 2 |
| mixture of 15% 1.4-dichlorobutene and 85% 2.3-dichloropropene | 2 | 2 | 2 | 2 | 2 |
| mixture of 50% 1.3-dichloropropene and 50% 1.2-dichloropropane | 2 | 2 | 2 | 3 | 3 |
| control | 2 | 2 | 2 | 2 | 2 |
| Carrots after 1 week: | | | | | |
| ethylene dibromide | 3 | 4 | 4 | 5 | 5 |
| 1.4-dichlorobutene | 2 | 3 | 4 | 4 | 5 |
| 2.3-dichloropropene | 2 | 2 | 2 | 2 | 2 |
| mixture of 15% 1.4-dichlorobutene and 85% 2.3-dichloropropene | 2 | 2 | 2 | 2 | 2 |
| mixture of 50% 1.3-dichloropropene and 50% 1.2-dichloropropane | 2 | 2 | 3 | 3 | 4 |
| control | 2 | 2 | 2 | 2 | 2 |
| Carrots after 3 weeks: | | | | | |
| ethylene dibromide | 2 | 3 | 3 | 4 | 4 |
| 1.4-dichlorobutene | 2 | 2 | 3 | 4 | 4 |
| 2.3-dichloropropene | 2 | 2 | 2 | 2 | 2 |
| mixture of 15% 1.4-dichlorobutene and 85% 2.3-dichloropropene | 2 | 2 | 2 | 2 | 2 |
| mixture of 50% 1.3-dichloropropene and 50% 1.2-dichloropropane | 2 | 2 | 2 | 2 | 3 |
| control | 2 | 2 | 2 | 2 | 2 |

The examples show that the mixture according to the invention requires an essentially shorter period of refraining from cultivation than the known preparations, even at low soil temperatures.

*Example 3*

The testing of the following mixtures for nematicidal activity has been carried out using *Meloidogyne incognita* as testing species of the nematodes. 5 litres of infested soil each in Mitscherlich pots are treated with various doses of the test mixture and after a refraining period of 1 week tomatoes are planted thereon. Evaluation occurred after 4 weeks by checking the results of the plants for cysts. In the following table the lowest amount of inventive mixture is to be seen which gives suitable protection against attack by nematodes. As to the plant tolerance no mixture led to a damage under 300 p.p.m.

| Mixture of— | Minimum amount for killing of nematodes in p.p.m. |
|---|---|
| 12.5% 2.3-dichloropropene-(1) <br> 12.5% 1.2-dichloropropene-(1) <br> 30% 3.4-dichlorobutene-(1) <br> 45% 1.4-dichlorobutene-(1) | less than 40. |
| 50% 2.3-dichloropropene-(1) <br> 20% 3.4-dichlorobutene-(1) <br> 30% 1.4-dichlorobutene-(2) | 60. |
| 75% 2.3-dichloropropene-(1) <br> 10% 3.4-dichlorobutene-(1) <br> 15% 1.4-dichlorobutene-(2) | 60. |
| 75% 1.1.2.3.3-penta-chloropropane <br> 10% 3.4-dichlorobutene-(1) <br> 15% 1.4-dichlorobutene-(2) | 60. |
| 20% 1.2-dichloropropane <br> 20% 2.3-dichlorobutane <br> 60% 1.4-dichlorobutene-(2) | less than 40. |
| 40% 1.2.3-trichlorobutane <br> 60% 1.4-dichlorobutene-(2) | 50. |
| 12.5% 1-chlorobutene-(2) <br> 12.5% 3-chlorobutene-(1) <br> 12.5% 1.2-dichlorobutane <br> 12.5% 2.3-dichlorobutane <br> 20% 3.4-dichlorobutene-(1) <br> 30% 1.4-dichlorobutene-(2) | 50. |
| 36% 1.4-dichlorobutene-(2) <br> 34% 3.4-dichlorobutene-(1) <br> 16.5% tetra-chlorobutane <br> 13.5% other chlorinated butanes and butenes (the complete mixture is the crude chlorination mixture of the butadiene chlorination). | 50. |

We claim:

1. Method of combating nematodes which comprises treating soil with mixtures of 10 to 60% 1.4-dichlorobutene and 40 to 90% of a member selected from the group consisting of a chlorinated alkane having from 3 to 4 carbon atoms and a chlorinated alkene having from 3 to 4 carbon atoms.

2. A nematicidal composition consisting of a mixture of 10 to 60% 1.4-dichlorobutene and 40 to 90% of a member selected from the group consisting of a chlorinated alkane having from 3 to 4 carbon atoms and a chlorinated alkene having from 3 to 4 carbon atoms.

3. Method of combating nematodes which comprises treating soil with mixtures of 10 to 60% 1.4-dichlorobutene-(2) and 40 to 90% 2.3-dichloropropene-(1).

4. Method of combating nematodes which comprises treating soil with mixtures of 10 to 60% 1.4-dichlorobutene-(2) and 40 to 90% of a mixture of 3.4-dichlorobutene-(1), 2.3-dichloropropene-(1) and 1.2-dichloropropene-(1).

5. Method of combating nematodes which comprises treating soil with mixtures of 10 to 60% 1.4-dichlorobutene-(2), and 40 to 90% of 3.4-dichloro-butene-(1) and dichlorobutane.

6. Method of combating nematodes which comprises treating soil with mixtures of 10 to 60% 1.4-dichlorobutene-(2) and 40 to 90% of trichlorobutane.

7. Method of combating nematodes which comprises treating soil with mixtures of 10 to 60% 1.4-dichlorobutene-(2) and 40 to 90% of 3.4-dichlorobutene-(1) and pentachlorobutane.

References Cited in the file of this patent

UNITED STATES PATENTS 2,411,566    Evan _____ Nov. 26, 1946

FOREIGN PATENTS 124,387    Australia _____ June 12, 1947

OTHER REFERENCES

Agrl. Chemicals, November 1952, p. 39.
Agrl. Chemicals, February 1956, p. 61.